(12) United States Patent
Li et al.

(10) Patent No.: US 11,754,470 B2
(45) Date of Patent: Sep. 12, 2023

(54) SIMULATED PAVEMENT ROTARY DRUM AND AUTOMOBILE TEST EQUIPMENT

(71) Applicant: CITIC Dicastal Co., Ltd., Qinhuangdao (CN)

(72) Inventors: Shide Li, Qinhuangdao (CN); Desheng Chen, Qinhuangdao (CN); Zhigao Yin, Qinhuangdao (CN); Jun Wang, Qinhuangdao (CN); Zuo Xu, Qinhuangdao (CN); Hanqi Wu, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 24 days.

(21) Appl. No.: 17/368,232

(22) Filed: Jul. 6, 2021

(65) Prior Publication Data

US 2022/0316986 A1 Oct. 6, 2022

(30) Foreign Application Priority Data

Apr. 1, 2021 (CN) .......................... 202110353805.4

(51) Int. Cl.
*G01M 17/007* (2006.01)
*G01M 17/04* (2006.01)

(52) U.S. Cl.
CPC ........ *G01M 17/0074* (2013.01); *G01M 17/04* (2013.01)

(58) Field of Classification Search
CPC ........... G01M 17/0074; G01M 17/045; G01M 17/022; G01M 17/0078

(Continued)

(56) References Cited

U.S. PATENT DOCUMENTS

| 2004/0050150 A1* | 3/2004 | Jahn | G01M 17/0074 73/146 |
| 2009/0193883 A1* | 8/2009 | Strobel | G01M 17/0074 73/116.07 |

(Continued)

FOREIGN PATENT DOCUMENTS

DE 10141973 C1 * 4/2003 ........ G01M 17/0074

OTHER PUBLICATIONS

Lebus, Wayback Machine Snapshot, https://www.lebus-intl.com/products.php, Apr. 2017 (Year: 2017).*

*Primary Examiner* — Eric S. McCall
*Assistant Examiner* — Timothy P Graves
(74) *Attorney, Agent, or Firm* — IPRO, PLLC

(57) ABSTRACT

The present disclosure belongs to the technical field of tests of automobile wheels and automobile chassis suspension systems, and provides a simulated pavement rotary drum and automobile test equipment. A simulated cobblestone pavement, and a simulated impact pavement, so that a testing pavement at a test field is reproduced; an impact load caused by the track pavement, the cobblestone pavement, and the impact pavement can be applied to wheels and a chassis system; and a road simulation test of wheels and a suspension system of an automobile can be performed on bench test equipment. As verified, the simulated pavement rotary drum of the present disclosure can reproduce the simulated track pavement at the test field; and the consistency of radial impact loads is greater than 95% at the same speed and under the same vehicle load operating condition.

3 Claims, 9 Drawing Sheets

(58) Field of Classification Search
USPC ......... 73/118, 123, 124, 115.01, 118.01, 146
See application file for complete search history.

(56) References Cited

U.S. PATENT DOCUMENTS

2014/0373999 A1\* 12/2014 Hutchinson De Staercke ............
                                            B32B 37/10
                                             156/62.2
2019/0204186 A1\* 7/2019 Eisenbeiss .......... G01M 17/022

\* cited by examiner

SIMULATED PAVEMENT ROTARY DRUM AND AUTOMOBILE TEST EQUIPMENT

TECHNICAL FIELD

The present application relates to the technical field of tests of automobile wheels and automobile chassis suspension systems, and specifically relates to a simulated pavement rotary drum and automobile test equipment.

BACKGROUND

With the rapid development of the automobile industry, people have put forward higher requirements for the reliability and comfort of automobiles. In driving, an automobile will be subjected to vertical impact loads caused by uneven pavements such as cobblestones and tracks. The impact loads directly act on wheels and tires, and the wheels may deform or be cracked under the above conditions. According to incomplete statistics, most of failure forms of the wheels such as cracks and air leakage are mainly caused by a fatigue failure that occurs during use after a wheel deforms by the impact and has a stress concentration.

In order to ensure the reliability of the wheels, whole vehicle manufacturers and wheel manufacturers generally use bench tests or road tests at test fields for verification. A road test on a real vehicle at a test field can truly reflect actual operating conditions of a user's vehicle, thereby objectively identifying and determining the design problems. However, the road test at the test field needs to use a whole vehicle, professional test staff needs to be equipped, which causes a long period and high test cost. The bench test can verify the fatigue and strength performance of the wheels, such as a road testing machine verifying the fatigue performance of the wheels, and an impact testing machine verifying the strength performance of the wheels. However, the bench test for wheels often does not have proper rotary drums that simulate various pavements, and it is impossible to apply impact loads caused by various uneven pavements to the wheels and a chassis system. Test results will deviate from real results.

SUMMARY

Embodiments of the present application provide a simulated pavement rotary drum and automobile test equipment, which can solve the problems in the background art.

In order to achieve the above objectives, the present disclosure provides the following technical solution.

In a first aspect, a simulated pavement rotary drum is provided, including a rotary drum base body and a simulated pavement, wherein the rotary drum base body is cylindrical and the simulated pavement is fixed on a cylindrical side wall of the rotary drum base body; the simulated pavement is at least one of a simulated track pavement, a simulated cobblestone pavement, and a simulated impact pavement; the simulated track pavement is a pavement provided with rectangular bumps disposed at an equal interval; the simulated cobblestone pavement is a pavement that cobblestone-shaped bumps spread over; and the simulated impact pavement is a pavement provided with simulated speed bumps.

In some embodiments, the simulated road pavement is fixed on the rotary drum base body through bolts.

In some embodiments, a material of the simulated pavement is 7075 aluminum alloy, and a material of the rotary drum base body is Q345 carbon steel.

In some embodiments, weight reducing through holes are formed in the rotary drum base body along an axial direction.

In a second aspect, an embodiment of the present application provides a simulated pavement rotary drum, including a rotary drum base body and a simulated pavement, wherein the rotary drum base body includes a rotating shaft, a left fixed round plate, and a right fixed round plate; the left fixed round plate and the right fixed round plate are fixed on the rotating shaft, and can rotate with the rotating shaft; the simulated pavement is fixed between edges of the fixed round plate and the right fixed round plate; the simulated pavement is fixed on a cylindrical side all of the rotary drum base body; the simulated pavement is at least one of a simulated track pavement, a simulated cobblestone pavement, and a simulated impact pavement; the simulated track pavement is a pavement provided with rectangular bumps disposed at an equal interval; the simulated cobblestone pavement is a pavement that cobblestone-shaped bumps spread over; and the simulated impact pavement is a pavement provided with simulated speed bumps.

In some embodiments, bolt holes are formed in the edges of the left fixed round plate and the right fixed round plate; and left and right sides of the simulated pavement are fixed by means of cooperation of bolts and the bolt holes.

In some embodiments, a material of the simulated pavement is 7075 aluminum alloy, and a material of the rotary drum base body is Q345 carbon steel.

In some embodiments, weight reducing through holes are formed in the left fixed round plate and the right round plate along an axial direction.

In a third aspect, an embodiment of the present application provides automobile test equipment, including the simulated pavement rotary drum in any one of the foregoing embodiments.

Compared with the prior art, the present disclosure has the following beneficial effects.

The present disclosure provides the simulated pavement rotary drum and the automobile test equipment. The simulated pavement rotary drum includes the rotary drum base body and the simulated pavement that is at least one of the simulated track pavement, the simulated cobblestone pavement, and the simulated impact pavement, so that the testing pavement at the test field is reproduced; the impact load caused by the track pavement, the cobblestone pavement, and the impact pavement can be applied to wheels and a chassis system; a road simulation test of the wheels and the suspension system of the automobile can be performed on bench test equipment, thereby shortening the development period of the whole vehicle and reducing the development cost. As verified, the simulated pavement rotary drum of the present disclosure can effectively reproduce the simulated track pavement of a test field; and the consistency of radial impact loads is greater than 95% at the same speed and under the same vehicle load operating condition.

1—rotary drum base body; 2—simulated pavement; 3—fastening bolt; 4—bolt hole; 5—weight reducing through hole; 6—rotating shaft; 7—left fixed round plate; and 8—right fixed round plate.

DETAILED DESCRIPTION OF THE EMBODIMENTS

Embodiment 1

Figure 1:
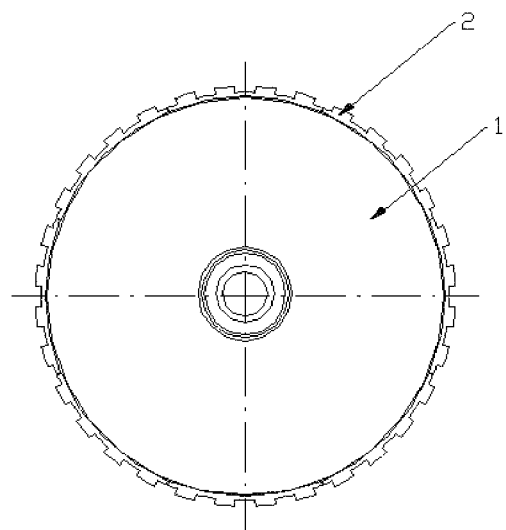
FIG. 1 is a schematic structural diagram of a simulated track pavement rotary drum of the present application.
Figure 2:
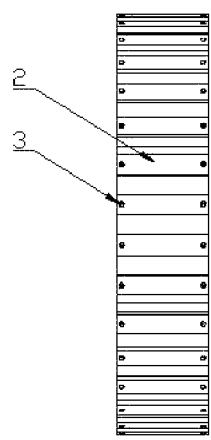
FIG. 2 is a schematic structural diagram of installation of a simulated track pavement of a simulated track pavement rotary drum of the present application.
Figure 3:
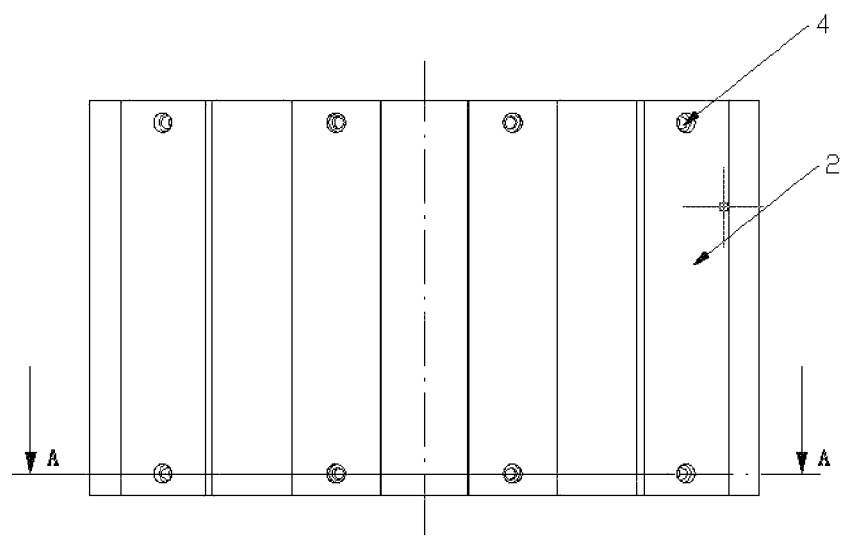
FIG. 3 is a schematic structural diagram of a simulated pavement of a simulated track pavement rotary drum of the present application;
}
Figure 4:
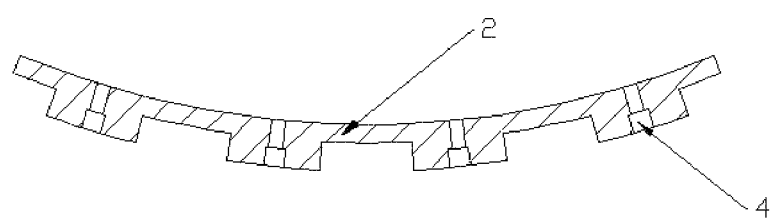
FIG. 4 is a sectional view of a simulated pavement of a simulated track pavement rotary drum of the present application along an A-A direction.

Embodiment 1 provides a simulated track road pavement rotary drum, as shown in FIGS. 1 to 4, including a rotary drum base body 1 and a simulated pavement 2, wherein the rotary drum base body 1 is cylindrical and the simulated pavement 2 is fixed on a cylindrical side wall of the rotary drum base body 1. In the present embodiment, the simulated pavement 2 is a simulated track pavement; the simulated track pavement is a pavement provided with rectangular bumps disposed at an equal interval; the width and the height of a track of the simulated track pavement are set according to actual needs. For example, the width of the track is 100 mm, and the height may be 20 mm, 30 mm or 50 mm. The simulated pavement 2 is fixed on the rotary drum base body 1 through fastening bolts 3. The type of the fastening bolts 3 is selected according to actual needs, such as M14, level 10.9. Two groups of bolt holes 4 are formed in the surface of the cylindrical side surface of the rotary drum base body 1, and each group includes 16 to 48 holes. As shown in FIGS. 2 to 4, each group of bolt holes 4 in the two groups of bolt holes 4 are uniformly distributed along the circumferential direction of the rotary drum base body 1, and are away from the edge of the cylindrical side wall of the rotary drum base body 1 at a certain distance. The distance is set according to an actual need, such as 25 mm. The aperture of each bolt hole 4 is set according to an actual need, such as 12.5 mm or 14.5 mm. Bolt holes 4 used for fixed installation are also formed in the simulated pavement 2.

A material of the simulated pavement 2 is 7075 aluminum alloy, and a material of the rotary drum base body 1 is Q345 carbon steel. The diameter and the width of the rotary drum base body 1 are set according to needs. For example, the diameter is 1500 mm to 2500 mm, and the width is 350 mm to 550 mm.

In some embodiments, the simulated pavement 2 may be at least one of a simulated track pavement, a simulated cobblestone pavement and a simulated impact pavement that is installed in multiple sections. For example, in the present embodiment, the simulated pavement 2 contains eight groups of simulated track pavements mounted in sequence along the circumference of the rotary drum base body 1.

In Embodiment 1, three simulated track pavements with different heights are tested.

Test 1: the diameter of the carbon steel rotary drum base body is 1960 mm, and the width is 450 mm. Two groups of bolt holes 4 are formed in the surface of the rotary drum base body, each group including 32 holes; each group of bolt holes 4 in the two groups of bolt holes 4 are uniformly distributed along the circumferential direction of the rotary drum base body, and are away from the edge of the rotary drum base body at 25 mm; and the aperture of each bolt hole 4 is 14.5 mm. The material of the rotary drum base body 1 is carbon steel Q345. Eight groups of simulated bolt pavements are mounted in sequence on the surface of the rotary drum base body in a bolting manner; the type of fastening bolts used is M14, level 10.9; the material of the simulated track pavement is 7075 high-strength wear-resistant aluminum alloy; and a simulated track is 100 mm in width and 20 mm in height. Rotary drums made according to this method constitute a first group.

Test 2: The diameter of the carbon steel rotary drum base body is 1960 mm, and the width is 450 mm. Two groups of bolt holes 4 are formed in the surface of the rotary drum base body, each group including 32 holes; each group of bolt holes 4 in the two groups of bolt holes 4 are uniformly distributed along the circumferential direction of the rotary drum base body, and are away from the edge of the rotary drum base body at 25 mm; and the aperture of each bolt hole 4 is 14.5 mm. The material of the rotary drum base body (1) is carbon steel Q345. Eight groups of simulated bolt pavements are mounted in sequence on the surface of the rotary drum base body in a bolting manner; the type of fastening bolts used is M14, level 10.9; the material of the simulated track pavement is 7075 high-strength wear-resistant aluminum alloy; and a simulated track is 100 mm in width and 30 mm in height. Rotary drums made according to this method constitute a second group.

Test 3: The diameter of the carbon steel rotary drum base body is 1960 mm, and the width is 450 mm. Two groups of bolt holes 4 are formed in the surface of the rotary drum base body, each group including 32 holes; each group of bolt holes 4 in the two groups of bolt holes 4 are uniformly distributed along the circumferential direction of the rotary drum base body, and are away from the edge of the rotary drum base body at 25 mm; and the aperture of each bolt hole 4 is 14.5 mm. The material of the rotary drum base body (1) is carbon steel Q345. Eight groups of simulated bolt pavements are mounted in sequence on the surface of the rotary drum base body in a bolting manner; the type of fastening bolts used is M14, level 10.9; the material of the simulated track pavement is 7075 high-strength wear-resistant aluminum alloy; and a simulated track is 100 mm in width and 40 mm in height. Rotary drums made according to this method constitute a third group.

The simulated track pavement rotary drums in Tests 1 to 3 in Embodiment 1 are mounted on a wheel road simulation bench, and the surfaces of the rotary drums simulate track pavements. A real vehicle's suspension and wheel and tire assembly is pressed on the surfaces of the track pavement rotary drums; and a testing machine is initiated to enable the rotary drums to rotate to measure a vertical load (a highest vertical load when the wheels pass through the track) on wheels. A simulated track test is performed by using the following operating conditions:

suspension: a Macpherson front suspension of a certain vehicle model;

wheels and tires: a 17-inch wheel and a 215/55R17 radial tire (with a tire pressure of 200 kPa);

set pressure on a contact surface: 4500 N (the highest static load of the wheel);

set operating speed: 60 km/h.

Vertical loads on the wheel and wheel deformations are measured. Results are as shown in Table 1:

TABLE 1

Measured vertical loads of the rotary drums on the wheel and wheel deformations in Tests 1 to 3.

| Group number | Parameters of the simulated track pavement | Vertical load (kN) | Wheel deformation (mm) |
|---|---|---|---|
| 1 | Track width: 100 mm, height: 20 mm | 25.3 | 0.8 |
| 2 | Track width: 100 mm, height: 30 mm | 27.6 | 1.1 |
| 3 | Track width: 100 mm, height: 40 mm | 29.7 | 1.3 |

Comparative Examples 4 to 6: Real Vehicle Test of a Wheel

The front left wheel of a certain real vehicle runs through three tracks at 60 km/h for testing. In Comparative example 4, the track parameters are: track width 100 mm, height 20 mm; in Comparative example 5, the track parameters are: track width 100 mm, height 30 mm; and in Comparative example 6, the track parameters are: track width 100 mm, height 40 mm. In order to ensure the safety of a driver, a square rolling shelf is mounted in a vehicle body; the driver wears a safety suit and a helmet; the front axle weight of the wheel is adjusted to 900 kg, and the rear axle weight is adjusted to 640 kg. The vehicle is driven to pass through the tracks at 60 km/h, and vertical loads on the wheel and wheel deformations are measured. Results are as shown in Table 2:

TABLE 2

Vertical loads on the wheel and wheel deformations that are measured at the real vehicle test field with the tracks of Comparative examples 4 to 6.

| Group number | Parameters of the simulated track pavement | Vertical load (kN) | Wheel deformation (mm) |
|---|---|---|---|
| 4 | Track width: 100 mm, height: 20 mm | 24.8 | 0.6 |
| 5 | Track width: 100 mm, height: 30 mm | 26.9 | 1.0 |

TABLE 2-continued

Vertical loads on the wheel and wheel deformations that are measured at the real vehicle test field with the tracks of Comparative examples 4 to 6.

| Group number | Parameters of the simulated track pavement | Vertical load (kN) | Wheel deformation (mm) |
|---|---|---|---|
| 6 | Track width: 100 mm, height: 40 mm | 28.7 | 1.3 |

Analysis of wheel deformation test results:

In the present embodiment, the tracks of the same specifications are selected in Tests 1 to 3 and Comparative examples 4 to 6, so that the results are comparable. Test data measured in Tests 1 to 3 and Comparative examples 4 to 6 in the present embodiment are compared to data in Table 3 and Table 4. A result table is as follows.

TABLE 3

Comparison of the vertical loads on the wheel

| Parameters of the simulated track pavement | Vertical load (kN) | |
|---|---|---|
| | Comparative example 1 | Embodiment 2 |
| Track width: 100 mm, height: 20 mm | 24.8 | 25.3 |
| Track width: 100 mm, height: 30 mm | 26.9 | 27.6 |
| Track width: 100 mm, height: 40 mm | 28.7 | 29.7 |

TABLE 4

Comparison of the wheel deformations

| Simulated track parameters | Wheel deformation (mm) | |
|---|---|---|
| | Comparative example 1 | Embodiment 2 |
| Track width: 100 mm, height: 20 mm | 0.6 | 0.8 |
| Track width: 100 mm, height: 30 mm | 1.0 | 1.1 |
| Track width: 100 mm, height: 40 mm | 1.3 | 1.3 |

It can be seen from the test results that under the same track parameters, the vertical loads on the wheels and the wheel deformations that are measured by the simulated track pavement rotary drums are high in consistency with the test results measured at the test field, so that the track impact test at the test field can be replaced.

In some other embodiments, in order to reduce the weight of the rotary drum base body to facilitate the installation, weight reducing through holes are formed in the rotary drum base body 1 along the axial direction.

Embodiment 2

Embodiment 2 provides a simulated impact road pavement rotary drum, as shown in FIGS. 5 to 8, including a rotary drum base body 1 and a simulated pavement 2, wherein the rotary drum base body 1 is cylindrical and the simulated pavement 2 is fixed on a cylindrical side wall of the rotary drum base body 1. In the present embodiment, the simulated pavement 2 is a simulated impact pavement, and the simulated impact pavement is a pavement provided with simulated speed bumps. The simulated pavement 2 can be a simulated impact pavement installed in multiple sections in sequence. For example, in the present embodiment, the simulated pavement 2 is symmetrically provided with two simulated speed bumps along the circle center of the rotary drum base body 1; the top surface width, the bottom surface width and the height of the simulated speed bump can be set according to an actual need, such as the top surface width 100 mm, the bottom surface width 300 mm, and the height 30 mm, 40 mm or 50 mm. The simulated pavement 2 is fixed on the rotary drum base body 1 through fastening bolts 3. The type of the fastening bolts 3 is selected according to actual needs, such as M12 or M16. Four groups of bolt holes 4 are uniformly formed in the surface of the cylindrical side wall of the rotary drum base body 1 along the circumference, and each group includes 15 bolt holes; three rows of bolt holes 4 are distributed along the axial direction of the rotary drum base body 1 in a spacing of 150 to 250 mm; five bolt holes are distributed in each row, and a curved distance is 100 mm; the bolt holes are M12 or M16, as shown in FIGS. 5 to 8. Bolt holes 4 used for fixed installation are also formed in the simulated pavement 2.

Figure 5:
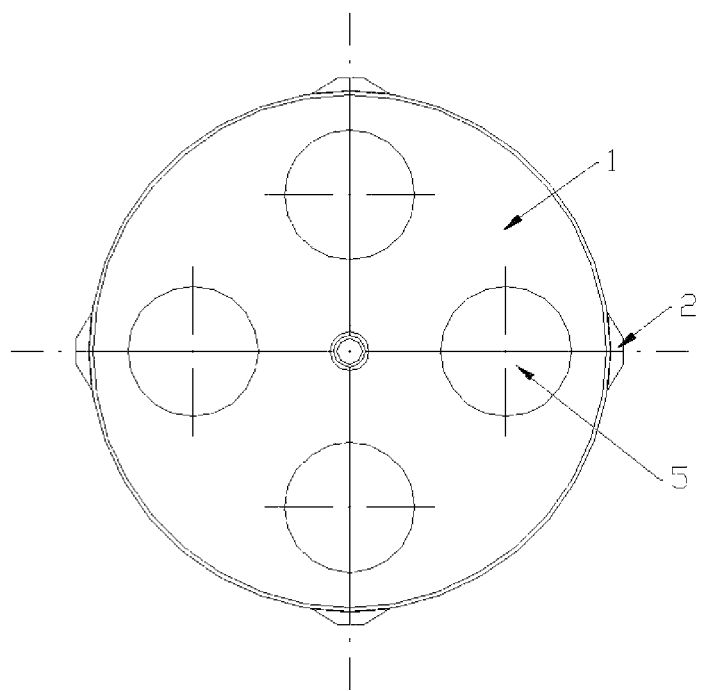
FIG. 5 is a schematic structural diagram of a simulated impact pavement rotary drum of the present application.
Figure 6:
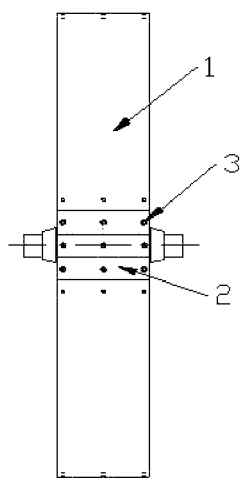
FIG. 6 is a schematic structural diagram of installation of a simulated impact pavement of a simulated impact pavement rotary drum of the present application.
Figure 7:
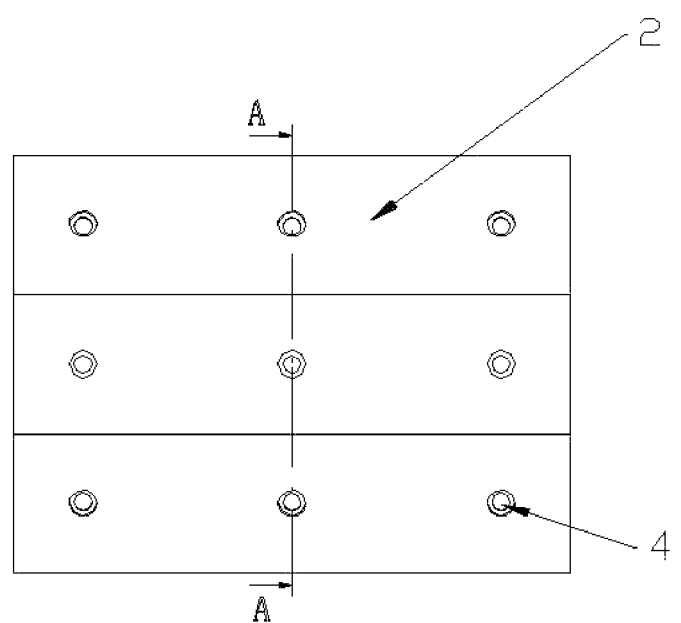
FIG. 7 is a schematic structural diagram of a simulated pavement of a simulated impact pavement rotary drum of the present application.
Figure 8:
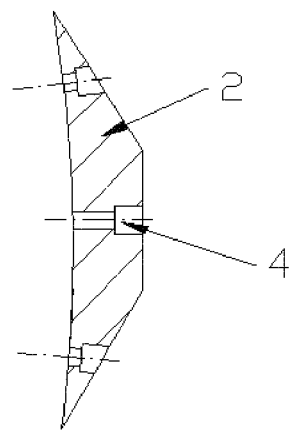
FIG. 8 is a sectional view of a simulated pavement of a simulated impact pavement rotary drum of the present application along an A-A direction.

As shown in FIG. 5, in order to reduce the weight of the rotary drum base body 1 to facilitate the installation, weight reducing through holes 5 are formed in the rotary drum base body 1 along the axial direction.

A material of the simulated pavement 2 is 7075 aluminum alloy, and a material of the rotary drum base body 1 is Q345 carbon steel. The diameter and the width of the rotary drum base body 1 are set according to needs. For example, the diameter is 1500 mm to 2500 mm, and the width is 350 mm to 550 mm.

In Embodiment 2, three impact pavements with different heights are tested.

Test 1: the diameter of the carbon steel rotary drum is 2000 mm, and the width is 450 mm. Four groups of bolt holes are formed in the surface of the rotary drum, and are uniformly distributed on the surface of the rotary drum; each group of the four groups of bolt holes includes 15 bolt holes; three rows of bolt holes are distributed along the axial direction of the rotary drum in a spacing of 200 mm; five bolt holes are distributed in each row, and a curved distance is 100 mm; and the bolt holes are M12. Two simulated speed bumps are symmetrically mounted on the surface of the rotary drum in a bolting manner, and fastening bolts used are at level 10.9; and a material of the simulated speed bumps is 7075 high-strength wear-resistant aluminum alloy, with the top surface width of 100 mm, the bottom surface width of 300 mm and the height of 30 mm. Rotary drums made according to this method constitute a first group.

Test 2: the diameter of the carbon steel rotary drum is 2000 mm, and the width is 450 mm. Four groups of bolt holes are formed in the surface of the rotary drum, and are uniformly distributed on the surface of the rotary drum; each group of the four groups of bolt holes includes 15 bolt holes; three rows of bolt holes are distributed along the axial direction of the rotary drum in a spacing of 200 mm; five bolt holes are distributed in each row, and a curved distance is 100 mm; and the bolt holes are M12. Two simulated speed bumps are symmetrically mounted on the surface of the rotary drum in a bolting manner, and fastening bolts used are at level 10.9; and a material of the simulated speed bumps is 7075 high-strength wear-resistant aluminum alloy, with the top surface width of 100 mm, the bottom surface width of 300 mm and the height of 40 mm. Rotary drums made according to this method constitute a second group.

Test 3: the diameter of the carbon steel rotary drum is 2000 mm, and the width is 400 mm. Four groups of bolt holes are formed in the surface of the rotary drum, and are uniformly distributed on the surface of the rotary drum; each group of the four groups of bolt holes includes 15 bolt holes; three rows of bolt holes are distributed along the axial direction of the rotary drum in a spacing of 200 mm; five bolt holes are distributed in each row, and a curved distance is 100 mm; and the bolt holes are M12. Two simulated speed bumps are symmetrically mounted on the surface of the rotary drum in a bolting manner, and fastening bolts used are at level 10.9; and a material of the simulated speed bumps is 7075 high-strength wear-resistant aluminum alloy, with the top surface width of 100 mm, the bottom surface width of 300 mm and the height of 50 mm. Rotary drums made according to this method constitute a third group.

The simulated impact pavement rotary drums in Tests 1 to 3 in Embodiment 2 are mounted on a wheel road simulation bench, and the surfaces of the rotary drums simulate speed bump impact pavements. A real vehicle's suspension and wheel and tire assembly is pressed on the surfaces of the simulated impact pavement rotary drums; and a testing machine is initiated to enable the rotary drums to rotate to measure a vertical load (a highest vertical load when the wheels pass through the speed bumps) on wheels. A simulated speed bump impact test is performed by using the following operating conditions:

suspension: a Macpherson front suspension of a certain vehicle model;

wheels and tires: a 17-inch wheel and a 215/55R17 radial tire (with a tire pressure of 200 kPa);

set pressure on a contact surface: 4500 N (the highest static load of the wheel);

set operating speed: 60 km/h.

Vertical loads on the wheel and wheel deformations are measured. Results are as shown in Table 5:

TABLE 5

Vertical impact loads of the rotary drums on the wheel and wheel deformations in Tests 1 to 3 of Embodiment 2

| Group number | Parameters of the simulated speed bumps | Vertical impact load (kN) | Wheel deformation (mm) |
| --- | --- | --- | --- |
| 1 | Top surface width: 100 mm, bottom surface width: 300 mm, and height: 30 mm | 33.3 | 1.2 |
| 2 | Top surface width: 100 mm, bottom surface width: 300 mm, and height: 40 mm | 38.5 | 1.8 |
| 3 | Top surface width: 100 mm, bottom surface width: 300 mm, and height: 50 mm | 42.1 | 2.2 |

Comparative Examples 4 to 6 of Tests at the Real Vehicle Test Field

The front left wheel of a certain real vehicle runs through three speed bumps at 60 km/h for testing. In Comparative example 4, parameters of the fourth group of speed bumps are: top surface width 100 mm, bottom surface width 300 mm, height 30 mm; in Comparative example 5, parameters of the fifth group of speed bumps are: top surface width 100 mm, bottom surface width 300 mm, height 40 mm; and in Comparative example 6, parameters of the sixth group of speed bumps are: top surface width 100 mm, bottom surface width 300 mm, height 50 mm. In order to ensure the safety of a driver, a square rolling shelf is mounted in a vehicle body; the driver wears a safety suit and a helmet; the front axle weight of the wheel is adjusted to 900 kg, and the rear axle weight is adjusted to 640 kg. The vehicle is driven to pass through the speed bumps at 60 km/h, and vertical loads on the wheel and wheel deformations are measured. Results are as shown in Table 6:

TABLE 6

Vertical impact loads of the speed bumps on the wheel and wheel deformations in Comparative examples 4 to 6 of the real vehicle

| Group number | Parameters of the simulated speed bumps | Vertical impact load (kN) | Wheel deformation (mm) |
| --- | --- | --- | --- |
| 4 | Top surface width: 100 mm, bottom surface width: 300 mm, and height: 30 mm | 32.7 | 1.1 |
| 5 | Top surface width: 100 mm, bottom surface width: 300 mm, and height: 40 mm | 36.2 | 1.7 |
| 6 | Top surface width: 100 mm, bottom surface width: 300 mm, and height: 50 mm | 40.8 | 2.1 |

Data obtained by experiments in Tests 1 to 3 and Comparative examples 4 to 6 in Embodiment 2 are analyzed.

In Embodiment 2, the speed bumps of the same specifications are selected in Tests 1 to 3 and Comparative examples 4 to 6, so that the results are comparable. Test data measured in Tests 1 to 3 and Comparative examples 4 to 6 in Embodiment 2 are compared to data in Table 7 and Table 8. A result table is as follows.

TABLE 7

Comparison of the vertical impact loads on the wheel

| Parameters of the simulated speed bumps | Vertical impact load (kN) | |
| --- | --- | --- |
| | Comparative example 1 | Embodiment 2 |
| Top surface width: 100 mm, bottom surface width: 300 mm, and height: 30 mm | 33.3 | 32.7 |
| Top surface width: 100 mm, bottom surface width: 300 mm, and height: 40 mm | 38.5 | 36.2 |
| Top surface width: 100 mm, bottom surface width: 300 mm, and height: 50 mm | 42.1 | 40.8 |

TABLE 8

Comparison of the wheel deformations

| Parameters of the simulated speed bumps | Wheel deformation (mm) | |
| --- | --- | --- |
| | Comparative example 1 | Embodiment 2 |
| Top surface width: 100 mm, bottom surface width: 300 mm, and height: 30 mm | 1.2 | 1.1 |
| Top surface width: 100 mm, bottom surface width: 300 mm, and height: 40 mm | 1.8 | 1.7 |
| Top surface width: 100 mm, bottom surface width: 300 mm, and height: 50 mm | 2.2 | 2.1 |

It can be seen from the test results that under the same speed bump parameters, the vertical impact loads on the wheels and the wheel deformations that are measured by the simulated impact pavement rotary drums are high in consistency with the test results measured at the test field, so that the speed bump impact test at the test field can be replaced.

Embodiment 3

Figure 9:
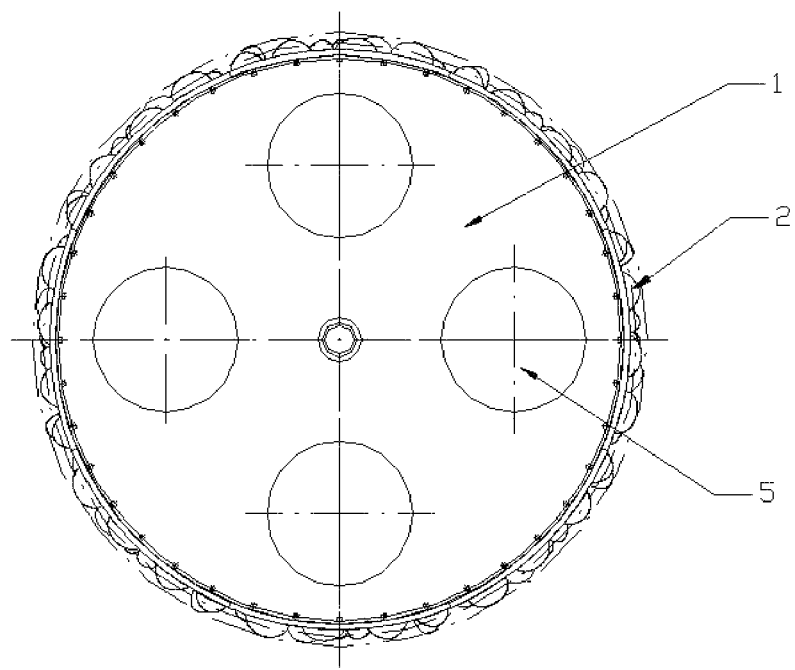
FIG. 9 is a schematic structural diagram of a simulated cobblestone pavement rotary drum of the present application.
Figure 10:
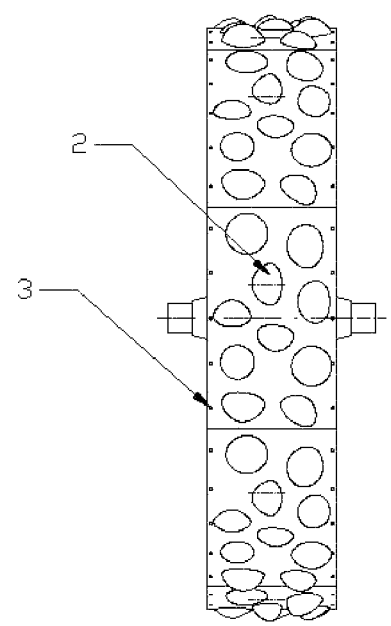
FIG. 10 is a schematic structural diagram of installation of a simulated cobblestone pavement of a simulated cobblestone pavement rotary drum of the present application.
Figure 11:
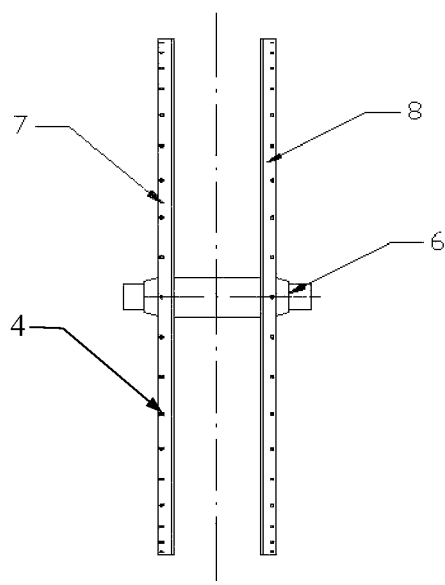
FIG. 11 is a schematic structural diagram of a rotary drum base body of a simulated cobblestone pavement rotary drum of the present application.
Figure 12:
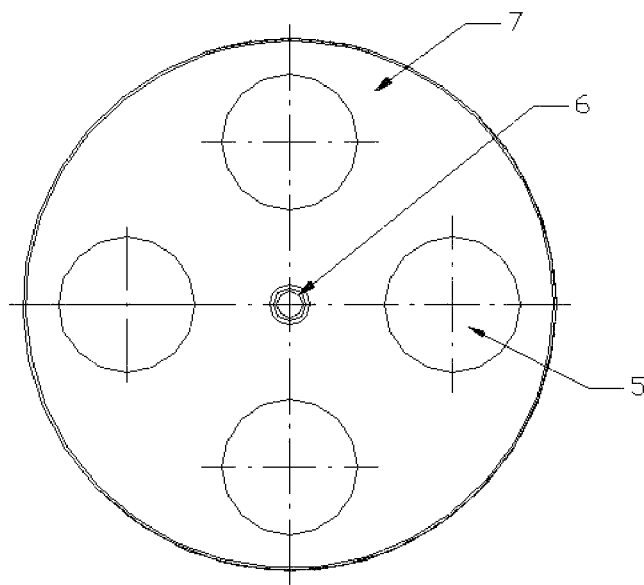
FIG. 12 is a left view of a rotary drum base body of a simulated cobblestone pavement rotary drum of the present application.
Figure 13:
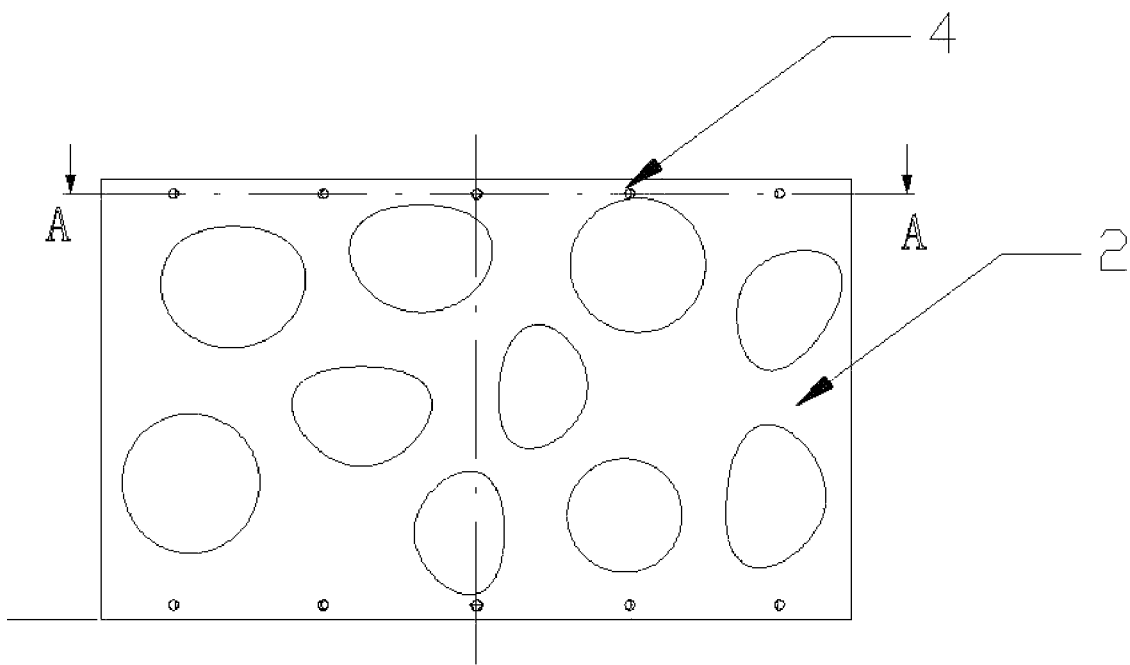
FIG. 13 is a schematic structural diagram of a simulated pavement of a simulated cobblestone pavement rotary drum of the present application.
Figure 14:
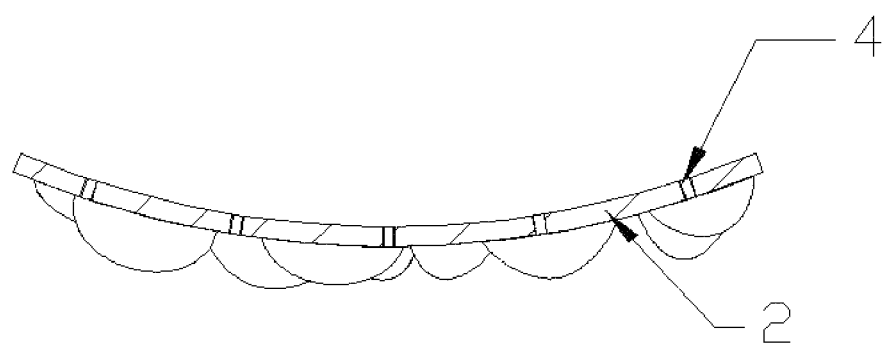
FIG. 14 is a sectional view of a simulated pavement of a simulated cobblestone pavement rotary drum of the present application along an A-A direction.

Embodiment 3 provides a simulated cobblestone pavement rotary drum, as shown in FIG. 9, including a rotary drum base body 1 and a simulated pavement 2. A material of the rotary drum base body is Q345 carbon steel, and a material of the simulated pavement is 7075 aluminum alloy.

The rotary drum base body 1 includes a rotating shaft 6, a left fixed round plate 7, and a right fixed round plate 8; and the left fixed round plate 7 and the right fixed round plate 8 are fixed on the rotating shaft 6, and can rotate with the rotating shaft 6. The diameters of the left fixed round plate 7 and the right fixed round plate 8 and a distance between them are set according to needs. For example, the diameters are 1500 mm to 2500 mm, and the distance therebetween is 350 mm to 550 mm. The simulated pavement 2 is fixed between edges of the left fixed round plate 7 and the right fixed round plate 8. In the present embodiment, the structural design of a non-solid rotary drum base body 1 is used. On one hand, materials are saved, and the cost is reduced; and on the other hand, the weight of the rotary drum base body is also reduced, which is more convenient for installation and test of the rotary drum.

One group of bolt holes 4 is uniformly formed in the edge of each of the left fixed round plate 7 and the right fixed round plate 8 along the circumference, and the quantity of the bolt holes 4 is set according to needs. For example, each group includes 24 to 56 holes; the size of the bolt holes 4 is set according to actual needs. For example, the aperture is 10.5 mm or 12.5 mm. Left and right sides of the simulated pavement 2 are fixed through cooperation of fastening bolts 3 and the bolt holes 4. Bolt holes 4 used for fixed installation are also formed in the simulated pavement 2. The simulated pavement 2 is a cobblestone pavement that is a pavement that cobblestone-shaped bumps spread over; and the simulated cobblestone pavement is manufactured by numerical control engraving.

As shown in FIG. 9, in order to reduce the weight of the rotary drum base body 1 to facilitate the installation, weight reducing through holes 5 are formed in the left fixed round plate 7 and the right fixed round plate 8 along the axial direction.

In some embodiments, the simulated pavement 2 can be at least one of a simulated track pavement, a simulated cobblestone pavement and a simulated impact pavement that is installed in multiple sections. For example, in Embodiment 3, the simulated pavement 2 contains eight groups of simulated cobblestone pavements mounted in sequence along the circumference of the rotary drum base body 1.

The specific size, such as the cobblestone arrangement density, the cobblestone height and the cobblestone diameter, of the simulated cobblestone pavement 2 can be selected and set according to needs, i.e., common parameters of the simulated cobblestone pavement 2 in Table 9.

TABLE 9

Common parameters of the simulated cobblestone pavement

| Group number | Cobblestone arrangement density (piece/m2) | Cobblestone height (mm) | Cobblestone diameter (mm) |
| --- | --- | --- | --- |
| 1 | 30-50 | 40-100 | 180-310 |
| 2 | 30-50 | 30-80 | 180-310 |
| 3 | 30-50 | 30-80 | 100-200 |
| 4 | 50-70 | 20-40 | 100-180 |

In Embodiment 3, four cobblestone pavements with different parameters are tested.

Test 1: the diameter of the carbon steel rotary drum base body is 1960 mm, and the width is 450 mm. Two groups of through holes are formed in the surface of the rotary drum base body, each group including 40 holes; each group of through holes in the two groups of through holes are uniformly distributed along the circumferential direction of the rotary drum base body, and are away from the edge of the rotary drum base body at 15 mm; and the aperture of each through hole is 12.5 mm. The material of the rotary drum base body 1 is carbon steel Q345. Eight groups of simulated bolt pavements are mounted in sequence on the surface of the rotary drum base body in a bolting manner; the type of fastening bolts used is M12, level 10.9; the material of the simulated cobblestone pavement is 7075 high-strength wear-resistant aluminum alloy; the cobblestone arrangement density is 30 to 50 pieces/m2; the cobblestone height is 40 mm to 100 mm; and the cobblestone diameter is 180 mm to 310 mm. Rotary drums made according to this method constitute a first group.

Test 2: the diameter of the carbon steel rotary drum base body is 1960 mm, and the width is 450 mm. Two groups of through holes are formed in the surface of the rotary drum base body, each group including 40 holes; each group of through holes in the two groups of through holes are uniformly distributed along the circumferential direction of the rotary drum base body, and are away from the edge of the rotary drum base body at 15 mm; and the aperture of each through hole is 12.5 mm. The material of the rotary drum base body 1 is carbon steel Q345. Eight groups of simulated bolt pavements are mounted in sequence on the surface of the rotary drum base body in a bolting manner; the type of fastening bolts used is M12, level 10.9; the material of the simulated cobblestone pavement is 7075 high-strength wear-resistant aluminum alloy; the cobblestone arrangement density is 30 to 50 pieces/m2; the cobblestone height is 30 mm to 80 mm; and the cobblestone diameter is 180 mm to 310 mm. Rotary drums made according to this method constitute a second group.

Test 3: the diameter of the carbon steel rotary drum base body is 1960 mm, and the width is 450 mm. Two groups of through holes are formed in the surface of the rotary drum base body, each group including 40 holes; each group of through holes in the two groups of through holes are uniformly distributed along the circumferential direction of the rotary drum base body, and are away from the edge of the rotary drum base body at 15 mm; and the aperture of each through hole is 12.5 mm. The material of the rotary drum base body (1) is carbon steel Q345. Eight groups of simulated bolt pavements are mounted in sequence on the surface of the rotary drum base body in a bolting manner; the type of fastening bolts used is M12, level 10.9; the material of the simulated cobblestone pavement is 7075 high-strength wear-resistant aluminum alloy; the cobblestone arrangement density is 30 to 50 pieces/m2; the cobblestone height is 30 mm to 80 mm; and the cobblestone diameter is 100 mm to 200 mm. Rotary drums made according to this method constitute a third group.

Test 4: the diameter of the carbon steel rotary drum base body is 1960 mm, and the width is 450 mm. Two groups of through holes are formed in the surface of the rotary drum base body, each group including 40 holes; each group of through holes in the two groups of through holes are uniformly distributed along the circumferential direction of the rotary drum base body, and are away from the edge of the rotary drum base body at 15 mm; and the aperture of each through hole is 12.5 mm. The material of the rotary drum base body (1) is carbon steel Q345. Eight groups of simulated bolt pavements are mounted in sequence on the surface of the rotary drum base body in a bolting manner; the type of fastening bolts used is M12, level 10.9; the material of the simulated cobblestone pavement is 7075 high-strength wear-resistant aluminum alloy; the cobblestone arrangement density is 50 to 70 pieces/m2; the cobblestone height is 20 mm to 40 mm; and the cobblestone diameter is 100 mm to 180 mm. Rotary drums made according to this method constitute a fourth group.

In Embodiment 3, the cobblestone pavement impact test is performed on the four groups of simulated cobblestone pavements in Tests 1 to 4.

The four groups of simulated cobblestone pavement rotary drums in Tests 1 to 4 in Embodiment 3 are mounted on a wheel road simulation bench, and the surfaces of the rotary drums simulate cobblestone pavements at the test field. A real vehicle's suspension and a wheel tire assembly with a six-component force sensor are pressed on the surfaces of the simulated cobblestone pavement rotary drums; a testing machine is initiated to enable the rotary drums to rotate; and vertical loads on a wheel are collected. A simulated cobblestone pavement fatigue test is performed by using the following operating conditions:

suspension: a Macpherson front suspension of a certain vehicle model;

wheels and tires: a 17-inch wheel and a 215/55R17 radial tire (with a tire pressure of 200 kPa);

set pressure on a contact surface: 4500 N (the highest static load of the wheel);

set operating speed: 40 km/h;

operating range: 300 mm.

Vertical loads and longitudinal loads on the wheel are collected, and relative damage values are counted. Results are as shown in Table 10:

TABLE 10

Collected data of the simulated pavement rotary drums of Tests 1 to 4 in Embodiment

| Group number | Parameters of the simulated cobblestone pavement | | | Maximum vertical load (kN) | Maximum longitudinal load (kN) | Average relative damage value |
|---|---|---|---|---|---|---|
| | Arrangement density (piece/m2) | Cobblestone height (mm) | Cobblestone diameter (mm) | | | |
| 1 | 30-50 | 40-100 | 180-310 | 21.02 | 15.21 | 1.17 |
| 2 | 30-50 | 30-80 | 180-310 | 17.91 | 12.55 | 1.05 |
| 3 | 30-50 | 30-80 | 100-200 | 15.24 | 10.93 | 0.86 |
| 4 | 50-70 | 20-40 | 100-180 | 12.80 | 8.19 | 0.40 |

Comparative Example: Test of a Wheel at a Real Vehicle Test Field

A certain vehicle is tested at reinforced durable sections, i.e., cobblestone roads 1# and 2#, at a certain automobile test field. The vehicle runs through the two cobblestone pavements at 40 km/h. Parameters of the cobblestone pavement of road 1# are as follows: the cobblestone arrangement density is 30 to 50 pieces/m2, the cobblestone diameter is 180 to 310 mm, and the cobblestone height is 40 to 100 mm; and parameters of the cobblestone pavement of road 2# are as follows: the cobblestone arrangement density is 50 to 70 pieces/m2, the cobblestone diameter is 100 to 180 mm, and the cobblestone height is 20 to 40 mm. In order to ensure the safety of a driver, a square rolling shelf is mounted in a vehicle body; the driver wears a safety suit and a helmet; the front axle weight of the wheel is adjusted to 900 kg, and the rear axle weight is adjusted to 640 kg. The vehicle is driven at 40 km/h till it passes through the cobblestone pavements; vertical loads and longitudinal loads on the front left wheel are collected; and relative damage values are counted. Results are as shown in Table 11:

TABLE 11

Data collected on the cobblestone pavements of roads 1# and 2#

| Type of the pavement | Parameters of the cobblestone pavement | | | Maximum vertical load (kN) | Maximum longitudinal load (kN) | Relative damage value |
|---|---|---|---|---|---|---|
| | Arrangement density (piece/m2) | Cobblestone height (mm) | Cobblestone diameter (mm) | | | |
| Road 1# | 30-50 | 40-100 | 180-310 | 19.51 | 13.20 | 1 |
| Road 2# | 50-70 | 20-40 | 100-180 | 11.09 | 7.37 | 0.38 |

It can be seen from the test results that under the same cobblestone pavement parameters (road 1# is compared to Tests 1 to 3, and road 2# is compared to Test 4), the vertical loads, longitudinal loads, and the relative damage which are measured on the simulated cobblestone pavement rotary drums are high in consistency with the test results measured at the test field. The simulated cobblestone pavement rotary drum in the present embodiment can replace the cobblestone pavement at the test field for testing.

Embodiment 4

Embodiment 4 provides automobile test equipment used to perform bench test on a wheel, bench test on chassis parts or bench test on a wheel and a chassis suspension. The equipment includes the simulated pavement rotary drum in any one of the foregoing embodiments. The automobile test equipment in the present embodiment uses the simulated pavement rotary drum in the foregoing embodiments, can reproduce a test pavement at a test field, and can apply impact loads caused by a track pavement, a cobblestone pavement, and an impact pavement to a wheel and a chassis system; road simulation testing of wheels and a suspension system of an automobile can be performed on bench test equipment, thereby shortening the development period of the whole vehicle and reducing the development cost.

What is claimed is:

1. A simulated pavement rotary drum, comprising a rotary drum base body and a simulated pavement, wherein
the rotary drum base body comprises a rotating shaft, a left fixed round plate, and a right fixed round plate; and the left fixed round plate and the right fixed round plate are fixed on the rotating shaft, and may rotate with the rotating shaft;
bolt holes are formed in the edges of the left fixed round plate and the right fixed round plate;
the simulated pavement is fixed between edges of the left fixed round plate and the right fixed round plate;
left and right sides of the simulated pavement are fixed by means of cooperation of bolts and the bolt holes;
the simulated pavement is at least one of a simulated track pavement, a simulated cobblestone pavement, and a simulated impact pavement;
the simulated track pavement is a pavement provided with rectangular bumps disposed at an equal interval;
the simulated cobblestone pavement is a pavement that cobblestone-shaped bumps spread over; and
the simulated impact pavement is a pavement provided with simulated speed bumps.

2. The simulated pavement rotary drum according to claim 1, wherein a material of the simulated pavement is 7075 aluminum alloy, and a material of the rotary drum base body is Q345 carbon steel.

3. The simulated pavement rotary drum according to claim 1, wherein weight reducing through holes are formed in the left fixed round plate and the right fixed round plate along an axial direction.

* * * * *